United States Patent

Tsuyuguchi et al.

[11] Patent Number: 5,107,479
[45] Date of Patent: Apr. 21, 1992

[54] OPTICAL RECORDING/REPRODUCING APPARATUS

[75] Inventors: Hiroshi Tsuyuguchi; Tsutomu Morita, both of Tokyo, Japan

[73] Assignee: TEAC Corporation, Japan

[21] Appl. No.: 346,416

[22] Filed: May 1, 1989

[30] Foreign Application Priority Data

May 6, 1988 [JP] Japan ............... 63-108977

[51] Int. Cl.5 .................................. G11B 7/00
[52] U.S. Cl. ............................ 369/50; 369/32; 369/44.36; 369/44.31; 369/44.35
[58] Field of Search ........... 369/44.29, 31, 50, 35, 369/36, 116, 32

[56] References Cited

U.S. PATENT DOCUMENTS

| | | | |
|---|---|---|---|
| 4,575,835 | 3/1986 | Nishikawa et al. | 369/50 |
| 4,603,412 | 7/1986 | Yamazaki | 369/50 |
| 4,611,317 | 9/1986 | Takeuchi et al. | 369/44.36 |
| 4,651,314 | 3/1987 | Yoshikawa et al. | 369/44.28 |
| 4,660,189 | 4/1987 | Tsukamura et al. | 369/116 |
| 4,789,975 | 12/1988 | Taniyama | 369/50 |

FOREIGN PATENT DOCUMENTS 55-122239  9/1980  Japan ............... 369/50

Primary Examiner—Roy N. Envall, Jr.
Assistant Examiner—Nabil Hindi
Attorney, Agent, or Firm—Andrus, Sceales, Starke & Sawall

[57] ABSTRACT

An optical recording/reproducing apparatus records an information signal on a rotary optical disk by irradiating an optical beam having an optical power such that an energy sufficient to cause recording of the information signal is incident to a unit area of the optical disk in a unit time while revolting to optical disk at a first predetermined speed, and plays back the information signal from the optical disk by irradiating the optical beam while revolving the optical disk with a second predetermined speed such that the energy incident to a unit area of the optical beam in a unit time at the time of playback does not cause recording on the optical disk.

6 Claims, 2 Drawing Sheets

OPTICAL RECORDING/REPRODUCING APPARATUS

BACKGROUND OF THE INVENTION

The present invention generally relates to optical recording/reproducing apparatus and particularly to an optical recording/reproducing apparatus for recording and/or playing back an information signal on and from an optical disk by means of a laser beam.

Conventionally, there is an optical recording/reproducing apparatus for recording an information signal on a rotary disk in a form of pits by irradiating same with a laser beam and for playing back the information signal from the disk by irradiating same with the laser beam so as to detect the existence or non-existence of the pits.

In such a conventional optical disk recording/reproducing apparatus, the recording is made while rotating or revolving the disk at a predetermined speed which is determined on the basis of a relation between the sensitivity of the recording medium to the laser beam and the output power of the laser diode. In the conventional apparatus, the speed of revolution of the disk is usually set to be equal at the time of recording and at the time of playback.

In such an apparatus, it is necessary to reduce the intensity of the laser beam at the time of playback relative to the case of recording so that no erroneous recording is made on the disk at the time of playback. For this purpose, the output power of the laser diode which is usually set to a first level P1 (FIG. 3) which may be 6 mW for example at the time of recording, is reduced to a second level P2 (FIG. 3) which may be 1.2 mW at the time of playback. By changing the output level of the laser diode as such, the information signal is recorded on and reproduced from the optical disk with a data transfer rate such as 2 Mbit/sec.

As far as the recording is concerned, one can achieve a satisfactory signal-to-noise (S/N) ratio or carrier-to-noise (C/N) ratio in such a conventional apparatus with respect to the noise produced in the laser diode because of the large output power. At the time of playback where the output power of the laser diode is reduced to one fifth as compared to the case of recording, however, there is a problem in that the noise caused in the laser diode which may be at least equal to the noise at the time of recording deteriorates the S/N or C/N ratio. Further, the data transfer rate is limited to a same rate such as 2 Mbit/sec for both of the recording and playback.

SUMMARY OF THE INVENTION

Accordingly, it is a general object of the present invention to provide a novel and useful optical recording/reproducing method and apparatus wherein the aforementioned problems are eliminated.

Another object of the present invention is to provide an optical recording/reproducing method and apparatus for recording and/or reproducing an information signal on and/or from a rotary optical disk wherein the S/N ratio or C/N ratio at the time of playback is improved.

Another object of the present invention is to provide an optical disk recording/reproducing method and apparatus for recording an information signal on a rotary optical disk by irradiating same with an optical beam and for playing back the recorded information signal from the rotary optical disk by irradiating same with the optical beam, wherein the speed of revolution of the optical disk at the time of playback is set to a value which is larger than the speed at the time of recording so that an energy of the optical beam incident to a unit area of the optical disk in a unit time at the time of playback is made smaller than the energy of the optical beam correspondingly incident to the optical disk at the time of recording. According to the present invention, one can use a large output power of the laser diode for both of the recording and playback modes. As a result of the use of the large output power, one can reduce the S/N ratio or C/N ratio for the noise produced in the laser diode at the time of playback. Further, one can increase the rate of data transfer at the time of playback as compared to the conventional apparatus.

Other objects and further features of the present invention will become apparent from the following detailed description when read in conjunction with attached drawings.

DETAILED DESCRIPTION

Figure 1:
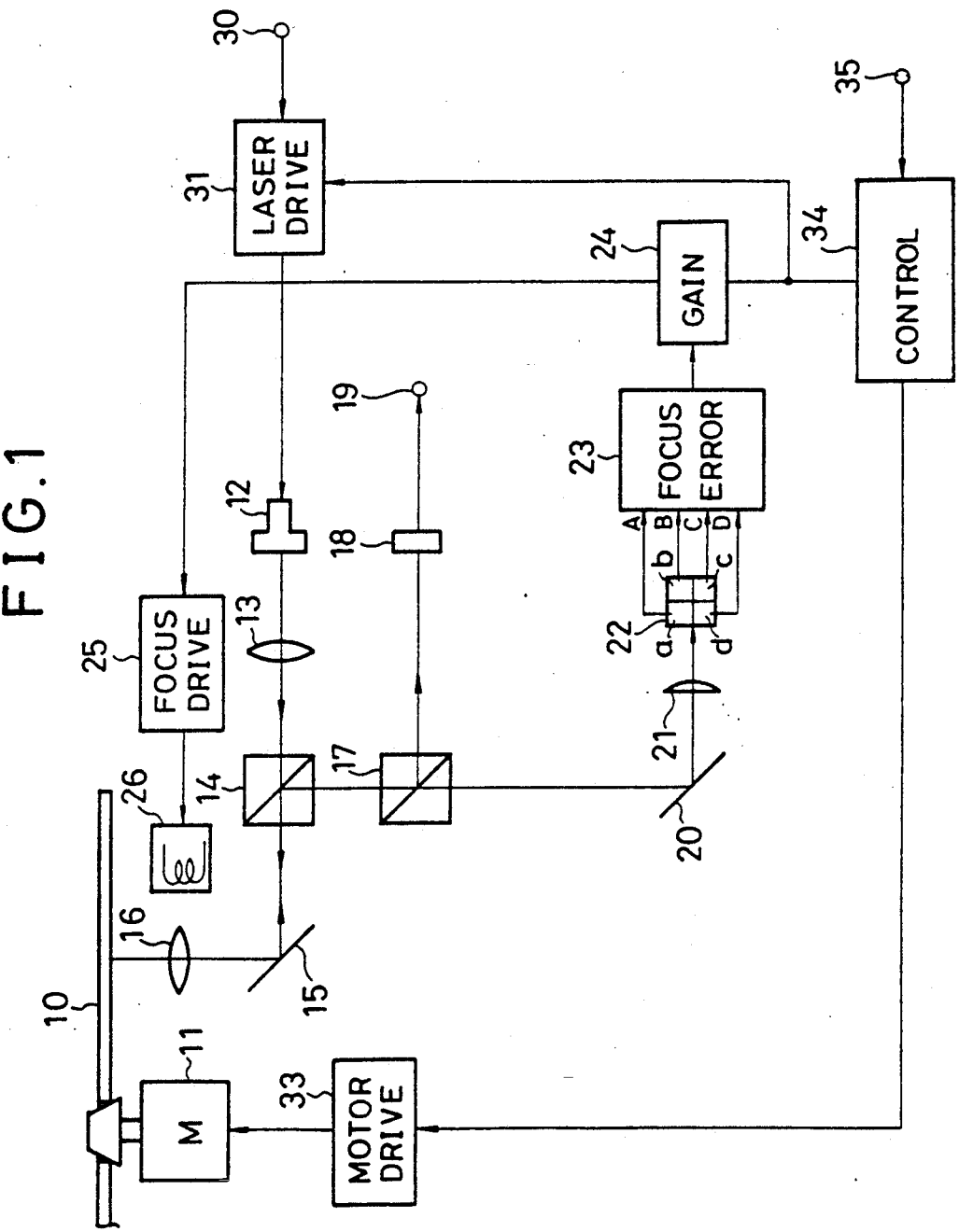
FIG. 1 is a block diagram showing the construction of an embodiment of the optical recording/reproducing apparatus of the present invention.

FIG. 1 shows a block diagram of an optical recording/reproducing apparatus according to an embodiment of the present invention.

Referring to FIG. 1, an optical disk 10 rotated by a drive motor 11 is recorded with an information signal by a laser beam which is produced by a laser diode 12 and focused on a recording surface of the disk 10 after passing through a collimator lens 13, beam splitter 14, tracking mirror 15 and an objective lens 16. Further, the optical beam reflected back from the disk 10 is passed through the objective lens 16, tracking mirror 15 and beam splitter 14 in reversed direction and reaches another beam splitter 17 where it is split into two branches. One branch is supplied to a photo sensor 18 for reproducing the information signal from the reflected optical beam and the information signal thus reproduced is supplied to a signal output terminal 19. The reflected light beam of the other branch is reflected by a mirror 20 and conducted to a quadrant photosensor 22 after passing through a cylindrical lens 21.

The quadrant photosensor 22 comprises first, second, third and fourth quadrants 22a, 22b, 22c and 22d respectively producing output signals A, B, C and D which are supplied to a focusing error detection circuit 23 where the signal A from the first quadrant and the signal C from the second quadrant are added to form a first sum signal (A+C) and the signal B from the third quadrant and the signal D from the fourth quadrant are added to form a second sum signal (B+D). Further, first and second sum signals are subtracted from each other, whereby a focusing error signal is obtained as (A+C)−(B+D). It should be noted that one can obtain the reproduced information signal by adding the signals A–D. In this case, one can omit the use of the photo sensor 18.

Figure 2A:
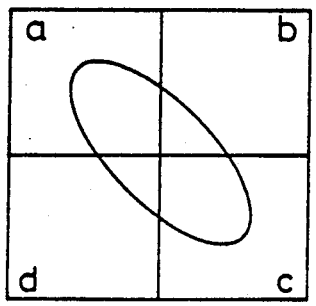
FIG. 2, consisting of 2A, 2B and 2C, is a diagram for explanation of the principle of astigmatic focusing control used in the apparatus of FIG. 1.
Figure 2B:
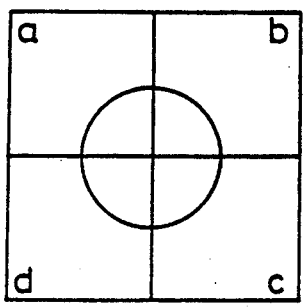
Figure 2C:
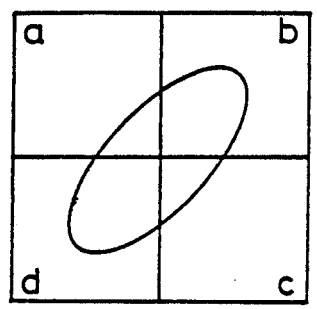

The apparatus of FIG. 1 carries out the astigmatic focusing servo control. When the optical disk 10 is closer to the objective lens 16 than its focal length, the beam spot formed on the quadrants 22a–22d of the photosensor 22 takes a form of eclipse elongating from the upper left quadrant 22a to the lower right quadrant 22c as shown in FIG. 2(A). When the optical disk 10 is far from the objective lens 16 beyond its focal length, on the other hand, the beam spot on the quadrants 22a–22d takes a form of eclipse elongating from the upper right quadrant 22b to the lower left quadrant 22d as illustrated in FIG. 2(C). When the disk 10 is exactly on the focus of the lens 16, the beam spot on the quadrants 22a–22d takes a form of true circle as shown in FIG. 2(B).

As the quadrants 22a–22d produce an electrical output responsive to the intensity of light falling thereon, the focusing error signal defined previously indicates by its value if the optical disk 10 is on the focus of the objective lens 16 or if it is off-focused. When it is off-focused, one can further discriminate if the disk 10 is too far from the lens 16 or too close to the lens 16 on the basis of the sign or sense of the focusing error signal.

The focusing error signal thus produced by the focusing error detection circuit 23 is supplied to a servo control circuit 25 after passing through a gain adjusting circuit 24. The focusing error signal is then amplified in the circuit 25 and energizes a solenoid 26 on which the objective lens 16 is carried. As a result, the objective lens 16 is moved such that the laser beam is properly focused on the optical disk 10.

The information signal to be recorded on the optical disk 10 is supplied to an input terminal 30. The signal is supplied to the laser diode 12 after passing through a laser drive circuit 31 where the laser beam is modulated with the information signal. The motor 11 is driven by a motor drive circuit 33.

In the optical recording/reproducing apparatus of the present invention, a system controller 34 is used for changing the operational mode between the recording mode and the playback mode responsive to a mode command signal from an input terminal 35. Responsive to the command signal, the system controller 34 supplies a control signal to the gain adjusting circuit 24, laser drive circuit 31 and the motor drive circuit 33.

Figure 3:
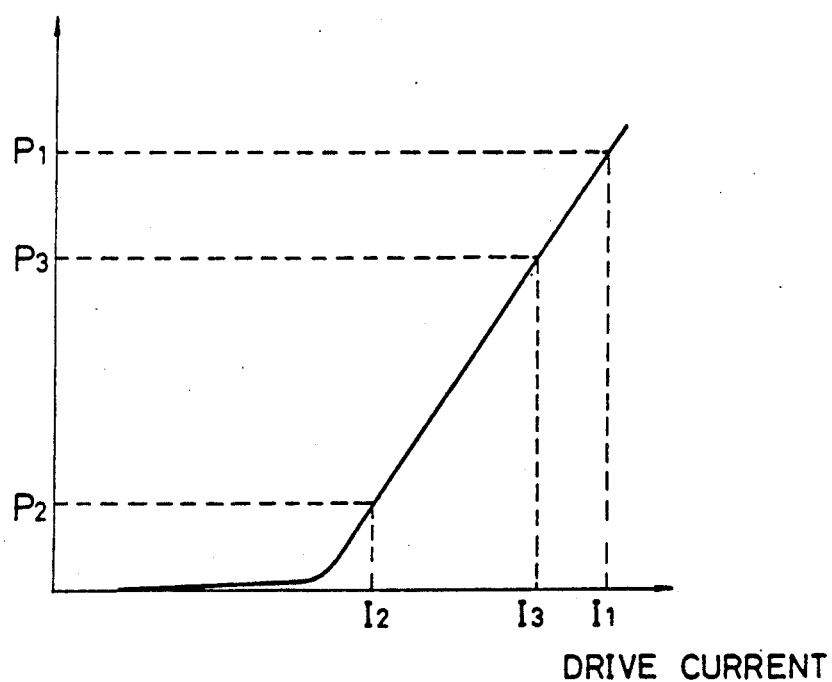
FIG. 3 is a characteristic curve showing a relationship between a drive current and output power of a laser diode used in the apparatus of FIG. 1.

FIG. 3 shows a relation between the drive current supplied from the laser drive circuit 31 to the laser diode 12 and the output power produced by the laser diode responsive to the drive current. At the time of recording, the system controller 34 produces a control signal indicating the recording mode responsive to the command signal at the input terminal 35. Responsive to the control signal, the laser drive circuit 31 supplies the drive current with a level indicated by I1. Referring to FIG. 3, the laser diode 12 thus driven produces an average output power P1 which may be 6 mW, for example. Of course, this output power P1 may be adjusted suitably according to the recording signal. At the same time, the gain of the gain adjusting circuit 24 is set to one. Further, the motor drive circuit 33 drives the motor 11 at a speed of 1800 rpm responsive to the control signal from the system controller 34.

At the time of playback, the system controller 34 produces a second control signal indicating the playback mode. Responsive to the second control signal, the laser drive circuit 31 supplies a drive current of level I3 to the laser diode 12, whereby an output power of P3 which may be 3.6 mW, for example, is obtained from the laser diode. Further, the gain of the gain adjusting circuit 24 is set to 1.66 responsive to the second control signal. Further, the motor drive circuit 33 drives the motor 11 at a speed of 5400 rpm.

In this example, the output power of the laser diode at the time of playback is three times larger than the usual level of the output power for the playback mode. In spite of such a high laser output power, the energy of the laser beam irradiated on a unit area of the optical disk in a unit time remains the same as in the conventional case, as the speed of revolution of the optical disk is increased to three times larger than the conventional speed for the playback mode. As a result, no pit is formed on the disk at the time of playback.

Further, the change in the level of the focusing error signal between the recording mode and the playback mode is compensated by the gain adjusting circuit 24 so that there is no substantial difference in the level of the focusing control signal. Thus, the focusing control in the playback mode is performed identically to the case of the recording mode.

In this method, the output power level of the laser diode 12 at the time of playback is three times larger than the output power level at the time of playback in the conventional apparatus. As a result, the S/N ratio or C/N ratio due to the noise produced in the laser diode 12 is improved significantly.

Further, the data transfer rate at the time of playback is increased to 6 Mbit/sec which is three times larger than the conventional rate of 2 Mbit/sec. The data transfer rate of 2 Mbit/sec at the time of recording remains the same.

In one modification, one may use a same output power P1 of 6 mW for both the recording and playback. In this case, the gain set by the gain adjusting circuit 24 is set to one for both the recording and playback. Further, the motor 11 is rotated at a speed of 9000 rpm. With this method, one can eliminate the use of the gain adjusting circuit 24 and further increase the S/N ratio or C/N ratio of the reproduced signal. Further, the data transfer rate at the time of playback is increased to 10 Mbit/sec which is five times larger than the conventional rate.

Further, the present invention is not limited to these embodiments but various variations and modifications may be made without departing from the scope of the invention.

What is claimed is:

1. An optical recording/reproducing apparatus for recording and/or reproducing an information signal on and/or from a rotary optical disk by means of an optical beam comprising:

a motor for rotating the optical disk;

a motor drive circuit supplied with a control signal, for driving the motor with a speed specified by the control signal;

an optical source supplied with a drive current, for producing the optical beam responsive to the supplied drive current;

an optical source drive circuit supplied with the information signal to be recorded, for producing the drive current which is modulated with the information signal;

first optical path means supplied with the optical beam from the optical source, for irradiating the optical beam on the optical disk, said first optical path means further receiving a reflected optical beam which is the optical beam reflected back from the optical disk and guiding the reflected optical beam therealong;

focusing means provided in the first optical path means for focusing the optical beam on the optical disk, focusing control means supplied with a focusing servo control signal for adjusting focusing of the optical beam on the optical disk by moving said focusing means, so that a proper focusing of the optical beam is maintained on the optical disk;

second optical path means optically coupled to said first optical path means for diverting the optical beam reflected by the optical disk and guided along the first optical path means;

photodetection means supplied with the reflected optical beam from the second optical path means for producing a reproduced information signal and the focusing servo control signal responsive to the detection of the optical beam supplied thereto; and a system controller supplied with a command signal commanding a recording or a playback operational mode of the apparatus, for producing said control signal such that said control signal specifies a first predetermined speed when the apparatus is in the recording mode, said first predetermined speed being such that a sufficient energy for causing recording is incident to a unit area of the optical disk in a unit time, and said system controller producing a control signal such that said control signal specifies a second predetermined speed which is substantially larger than the first predetermined speed when the apparatus is in the playback mode, said second predetermined speed being such that energy incident to a unit area of the optical disk in a unit time is insufficient to cause recording on the disk.

2. An optical recording/reproducing apparatus as claimed in claim 1 in which said photodetection means includes a gain adjusting circuit supplied with a gain setting signal for setting the gain of the circuit, for adjusting the level of the focusing servo control signal, and said system controller produces the gain setting signal such that the gain adjusting circuit amplifies the focusing servo control signal with a first predetermined gain in the recording mode and such that the gain adjusting circuit amplifies the focusing servo control signal with a second predetermined gain which is substantially larger than the first predetermined gain when in the playback mode, said first and second predetermined gains being chosen such that the focusing servo control signal supplied to the focusing control means has a substantially the same level in the recording mode and in the playback mode of the apparatus.

3. An optical recording/reproducing apparatus as claimed in claim 2 in which said optical source drive circuit is further supplied with an optical power setting signal for setting an optical power of the optical beam by changing an average level of the drive current, and said system controller further produces the optical power setting signal responsive to the command signal such that the optical power of the optical beam is set to a first predetermined level when in the recording mode and such that the optical power is set to a second predetermined level substantially smaller than the first predetermined level when in the playback mode.

4. A method of recording and playing back an information signal on and from a rotary optical disk by means of an optical beam, comprising the steps of:

recording the information on the optical disk by irradiating the disk with the optical beam at an optical power such than an energy sufficient to cause recording of the information signal is incident to a unit area of the optical disk in a unit time while revolving the optical disk at a first predetermined constant angular speed; and playing back the information signal from the optical disk by irradiating the disk with the optical beam while revolving the optical disk with a second predetermined constant angular speed such that the energy incident to a unit area of the optical disk in a unit time at the time of playback does not cause recording on the optical disk.

5. A method as claimed in claim 4 in which the optical beam having a same optical power is used for both the recording and playback.

6. A method as claimed in claim 4 in which an optical power of the optical beam is changed in the recording and in the playback.

* * * * *